United States Patent

Crouthamel et al.

[15] 3,663,363

[45] May 16, 1972

[54] IDENTIFICATION OF FAILED FUEL ELEMENTS

[72] Inventors: Carl E. Crouthamel, Glen Ellyn; Lester F. Coleman, Wheaton; George J. Bernstein, Park Forest, all of Ill.; Peter B. Henault, Idaho Falls, Idaho

[73] Assignee: The United States of America as represented by the United States Atomic Energy Commission

[22] Filed: Mar. 13, 1969

[21] Appl. No.: 806,942

[52] U.S. Cl. ............................. 176/19 LD, 176/68, 176/80
[51] Int. Cl. .......................................................... G21c 17/04
[58] Field of Search ............................. 176/19, 19 LD, 68, 80

[56] References Cited

UNITED STATES PATENTS

| | | |
|---|---|---|
| 3,157,580 | 11/1964 | Williams .................................. 176/68 |
| 3,180,804 | 4/1965 | Flora et al. ......................... 176/68 UX |
| 3,460,236 | 8/1969 | Shoudy, Jr. ........................... 176/68 X |

FOREIGN PATENTS OR APPLICATIONS

| | | |
|---|---|---|
| 891,179 | 3/1962 | Great Britain ............................ 176/68 |
| 968,039 | 8/1964 | Great Britain ............................ 176/68 |
| 939,714 | 10/1963 | Great Britain ...................... 176/19 LD |

*Primary Examiner*—Carl D. Quarforth
*Assistant Examiner*—Harvey E. Behrend
*Attorney*—Roland A. Anderson

[57] ABSTRACT

Each subassembly in a breeder reactor is tagged with a gas containing a different mixture of xenon isotopes having a mass number from 124 to 130. The reactor cover gas is tested for fission-product gases and if any are found they are tested for light xenon isotopes to identify which subassembly has failed.

1 Claim, 1 Drawing Figure

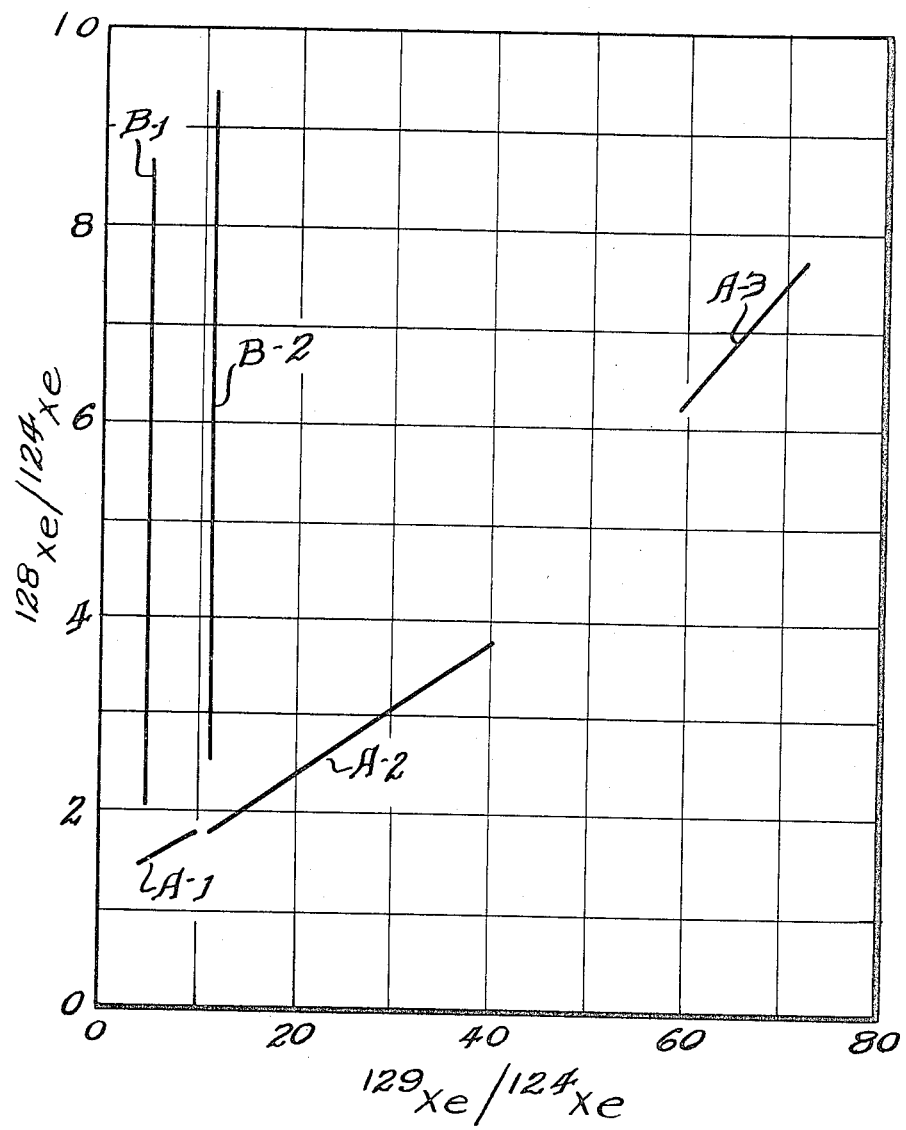

IDENTIFICATION OF FAILED FUEL ELEMENTS

The invention described herein was made in the course of, or under, a contract with the United States Atomic Energy Commission.

BACKGROUND OF THE INVENTION

This invention relates to a process for identifying which, if any, fuel elements have failed in a nuclear reactor and more particularly to a process using various xenon isotopes as identification tags for the fuel elements.

Experimental Breeder Reactor II (EBR II) is an Atomic Energy Commission facility for testing various aspects of breeder reactor technology. To determine strengths of materials, among other things, destructive testing is often the best method of finding the exact point at which a specific material or design fails. Not only the gathering of information but the speed of gathering is important in these tests because an excessive time delay between failure and knowledge of that failure introduces error and may result in damage to the reactor. It would be of little use to rapidly know that a fuel element or test loop had failed but not to be able to identify the particular fuel element or test loop.

Fuel elements may be classified into two groups, vented and closed. Some conceptual designs for breeder reactors make allowance for venting fission-product gases into the coolant while some designs provide for a gas plenum in each fuel element to collect fission-product gases as they are produced. The process of this invention is applicable only to the closed type of fuel element. EBR II uses this type of fuel element; it is a closed, gas-bonded element with helium as the heat-transfer medium between the fuel and the cladding. When a leak occurs fission-product gases pass through the coolant to the cover gas, which in the case of EBR II is argon.

One method of identifying which fuel element or test loop has failed is to tag each fuel element or test loop with a different material. The tag must not be unduly affected by the intense radiation, nor must it be produced in quantity in the reactor by irradiation, nor must it adversely affect the neutron flux; on the other hand, the tag must be readily identifiable and it must be transported from the fuel element or test loop to the detection situs with any escaping fission-product gases. Heretofore, tags have not been available that adequately meet all the above requirements.

SUMMARY OF THE INVENTION

This invention comprises adding to each fuel element in a subassembly or to a test loop a gas containing a different mixture of xenon isotopes having a mass number less than 131, periodically testing the reactor cover gas for fission-product gases and if found examining said gases for xenon isotopes.

BRIEF DESCRIPTION OF THE DRAWING

The FIGURE shows the isotopic relationship of various xenon mixtures.

DETAILED DESCRIPTION OF PREFERRED EMBODIMENT

Xenon isotopes with mass numbers 131 to 136 are produced in quantity during fission; therefore, these isotopes are not useful as tags. The lighter xenon isotopes having mass numbers 124–130 fulfill the requisites of good tags in that they are not produced to any significant degree during fission, do not have an adverse effect on the neutron flux, they are unaffected by irradiation, they are transported to the cover gas with the fission-product gases and are identifiable by means of a mass spectrometer. Addition of a xenon tag to a helium-bonded fuel element is simple because xenon is so much denser than helium that injection of 1 ml of xenon into the gas plenum prior to welding the end caps onto the fuel element displaces an equal volume of helium from the gas-bonded fuel element. The diffusion rate of xenon through helium is slow enough not to require special hurry-up welding techniques.

Table I sets out the isotopic composition of natural xenon and three commercially available mixtures enriched in certain light isotopes.

TABLE I

| Xenon Isotope Mass Number | Total Xenon[a] (mol %) Enriched Mixtures | | | Natural Xenon |
|---|---|---|---|---|
| | No. 1 | No. 2 | No. 3 | |
| 124 | 12.0 | 5.7 | 1.3 | 0.096 |
| 126 | 4.5 | 1.9 | 0.8 | 0.090 |
| 128 | 17.4 | 10.1 | 8.1 | 1.92 |
| 129 | 59.0 | 63.8 | 64.3 | 26.44 |
| 130 | 2.4 | 4.2 | 5.1 | 4.08 |
| 131 | 2.8 | 9.1 | 12.8 | 21.18 |
| 132 | 1.4 | 4.8 | 7.1 | 26.89 |
| 134 | 0.3 | 0.3 | 0.5 | 10.44 |
| 136 | 0.2 | 0.1 | 0.1 | 8.87 |

[a] Xenon purity ≥ 99.0%

Since the various enriched mixtures of xenon may be combined in different quantities to produce mixtures with different isotopic ratios, there are numerous possibilities for tag mixtures. In addition, other tags may be prepared by mixing natural xenon with any of the above enriched mixtures or by preparing pure $^{128}$Xe by the following reaction:

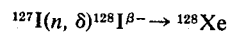

$$^{127}I(n, \delta)^{128}I^{\beta^-} \rightarrow {}^{128}Xe$$

and mixing it with either natural xenon or any of the enriched mixtures listed in Table I. During irradiation of the fuel elements, some $^{128}$Xe and $^{129}$Xe are produced as fission-product gases, but the tags can be so constructed that the small amounts of these isotopes produced during irradiation will not materially affect the isotopic ratios of the tags.

Reference to the figure shows some of the various possible combinations using natural xenon, the commercial xenon mixtures of Table I and pure $^{128}$xenon. Each line corresponds to a series of tags formed by mixing either natural xenon with one of the commercial mixtures. Table II identifies the series of tags in the figure while the constituents of the enriched mixtures are found in Table I.

TABLE II

| | |
|---|---|
| A1: | natural Xe + enriched mixture 1 |
| A2: | natural Xe + enriched mixture 2 |
| A3: | natural Xe + enriched mixture 3 |
| B1: | $^{128}$Xe + enriched mixture 1 |
| B2: | $^{128}$Xe + enriched mixture 2 |

The figure shows tags which have a $^{128}$Xe: $^{124}$Xe ratio from about 2 to over 9 and a $^{129}$Xe: $^{124}$Xe ratio from about 4.9 to about 73.

In practice, not every fuel element will be tagged with a different isotopic mixture because removal of an individual element is not usually feasible. As a fuel subassembly is generally the smallest number of elements which may be removed at a given time, all the fuel elements in a particular subassembly will contain the same mixture of light xenon isotopes.

EBR II uses sodium as a coolant and, as stated before, argon as a cover gas. Other considerations affecting the use of xenon tags are xenon solubility in sodium and the effect of xenon contamination of the cover gas from outside sources such as air leakage, supply argon, and previous fuel failures. Experiments have been performed that show the xenon solubility in sodium at 375° C. is about 5 ×10$^{-12}$ atom Xe/atom Na at 1 atmosphere xenon pressure. This low xenon solubility in sodium does not impair transfer of the tag mixture from the fuel element to the cover gas to any significant degree. Since xenon has appreciable solubility in water, use of xenon tags is not feasible in a water-cooled reactor.

In another experiment, cover gas from the EBR II was sampled before and after addition of a 0.7 ml tag. Calculations showed that the background xenon in the cover gas was only about 3–5 percent of the added tag. The contaminants in the cover gas changed the key isotopic ratio, $^{129}Xe/^{124}Xe$ in this experiment, from 11.29 to 11.36. As the next isotopic ratio in the $^{129}Xe/^{124}Xe$ tag series was 13.5, the background xenon did not render the tags indistinguishable.

Many breeder designs in addition to EBR II specify argon as the cover gas. Assuming fuel element failure and the presence of light xenon isotopes in the cover gas, the ratio of argon to xenon may be as much as 100,000:1. For a rapid and accurate determination of the exact ratio of light xenon isotopes present, the argon-xenon mixture is passed through a charcoal trap maintained at −78° C. to preferentially adsorb xenon on the charcoal. Most of the argon passes through the trap; thereafter, xenon with a much smaller volume of argon is desorbed from the charcoal by heating. A 10 cubic foot sample of cover gas is reduced by this process to several hundred cubic centimeters of xenon-rich gas suitable for use in a mass spectrometer. The various tags ennumerated here are not by any means exhaustive of all the possible combinations of light xenon isotopes applicable to this invention but are meant to be representative of the invention which is defined in the appended claims.

The embodiments of the invention in which an exclusive property or privilege is claimed are defined as follows:

1. The process for identifying failed fuel elements in a breeder reactor having a cover gas present therein comprising injecting a different mixture of stable xenon isotopes having a mass number of 124–130 into each of a plurality of unirradiated helium-bonded fuel elements, the mixture injected into one fuel element having a $Xe^{129}/Xe^{124}$ ratio of 11.29 and the mixture injected into another having a $Xe^{129}/Xe^{124}$ ratio of 13.5, the amount of the mixture of isotopes injected into each of said plurality of fuel elements and the ratio of isotopes present therein being selected so that the small amount of xenon isotopes produced as fission-product gases during irradiation of the fuel elements will not materially affect the isotopic ratios of said mixtures, hermetically sealing the fuel elements with the xenon mixtures therein, operating the reactor with the said fuel elements therein, and determining the ratio of the said isotopes of xenon present in the cover gas of the reactor, the presence of said isotopes indicating that a fuel element has failed and the ratio indicating which fuel element has failed.

* * * * *